Dec. 28, 1926.

P. G. LEONARD

FISHING TOOL

Filed April 2, 1926

1,611,923

Witnesses:
Wayne Hudson

Inventor:
Peter Gustaf Leonard
By Joshua R H Polk
Atty's

Patented Dec. 28, 1926.

1,611,923

UNITED STATES PATENT OFFICE.

PETER GUSTAF LEONARD, OF WEST TULSA, OKLAHOMA.

FISHING TOOL.

Application filed April 2, 1926. Serial No. 99,191.

My present invention relates to fishing tools, and it has for its general object to provide an improved type of fishing tool for use in connection with oil wells, to engage and withdraw large couplings or unions, especially where the clearance space between the couplings or unions and the tubing containing the same is relatively small.

A further object of the invention is to provide an improved construction of means for obtaining the foregoing object through the instrumentality of a socket member arranged to be slipped through the clearance space and to be closed under the coupling or union for a straight upward lift of the same from the well.

A still further object is to provide a novel releasable means for effecting the closing of the socket member, such releasable means being arranged to be set free through the actuation of plunger means arranged to encounter the coupling or union to be recovered.

Other objects will appear hereinafter.

The invention consists in the combinations and arrangements of parts hereinafter described and claimed.

The invention will be best understood by reference to the accompanying drawing forming a part of this specification, and in which, Fig. 1 represents an elevational view of a fishing tool made in accordance with the present invention, the tubular body being shown in the position it occupies for securing the holding fingers in position for the recovery of the entrapped coupling;

Figure 1:
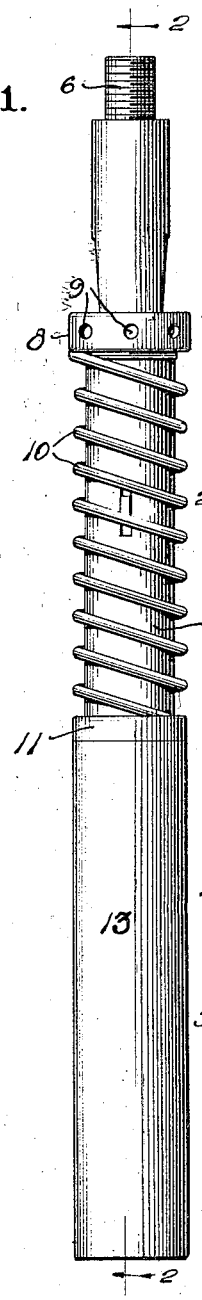
Figure 2:
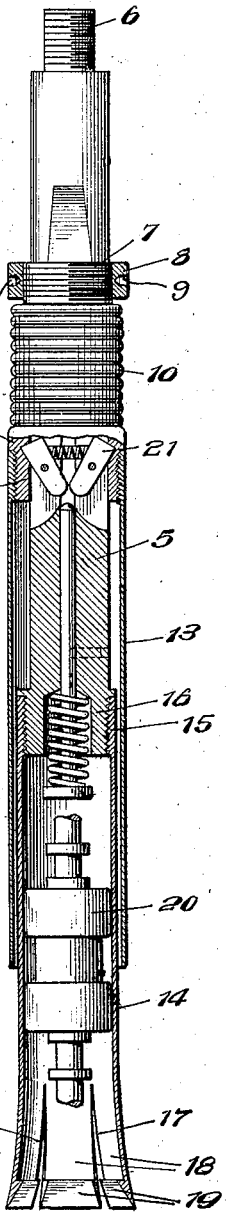
Fig. 2 represents a longitudinal section taken substantially on the line 2—2 of Fig. 1, but showing the tubular body upheld by the locking dogs and showing also a coupling or union within the socket member in position to be encountered by the contact for the release of the dogs.

My improved fishing tool, in its preferred form of construction, as illustrated in the accompanying drawing, comprises a main cylindrical body 5 having at its top end a suitable threaded region 6 by which to be attached to any suitable lifting or operating mechanism, and having also at a point below its top end a raised threaded region 7 on which a collar 8 is adapted to be screw threaded and adjusted. The collar 8 is provided with suitable circumferential openings 9 for receiving a tool by which to be turned for the compression of a spring 10 coiled about the main body and having bearing against the flange 11 of a ring 12 slidably fitting the main body 5.

Screw threaded to the ring 12 is a tubular body 13 which surrounds the main body 5 and also a socket member 14. At its upper end the socket member 14 is screw threaded at 15 to the lower end or head 16 of the main body from which it depends. At its lower end the depending socket member 14 is provided with spaced slits or openings 17 to produce the spring holding fingers 18. At their free ends the holding fingers 18 are made with inner supporting lugs 19 whose faces are beveled upwardly and inwardly as shown so as to adapt the socket member, while being lowered in the well tubing, to slip over a rod joint or coupling as 20 for entrapping the same within the socket member. The construction, arrangement and proportion of these parts are such that when the ring 12 with the tubular body is upheld upon the main body by means of the dogs 21, the holding fingers 18 will be unlocked and free to be passed about a coupling or union as 20; and that when the ring and tubular body has dropped because of the release of the dogs 21 and the consequent expansion of the spring 10, the holding fingers 18 will be locked together by the tubular body 13 so that the supporting lugs 19 will engage under the coupling or union 20 for the recovery of the same.

Figure 3:
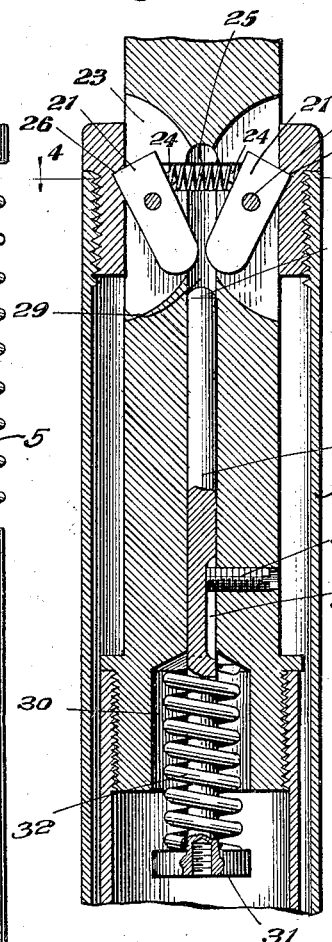
Fig. 3 represents an enlarged sectional view, showing in particular the arrangement of the locking dogs and of the plunger by which the dogs are released.
Figure 4:
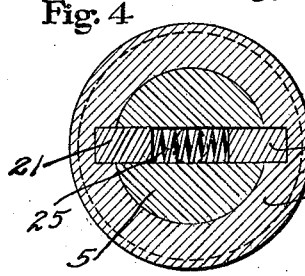
Fig. 4 represents a cross section taken substantially on the line 4—4 of Fig. 3.

As best illustrated in Fig. 3, there are two dogs 21 which are arranged in opposed relation upon pins 22 for operation in suitable slots 23 cut in the main body 5. The confronting sides of the dogs 21 are provided with projecting lugs 24 designed to serve as guides for a coiled spring 25 interposed between and in engagement with the dogs as shown, so as to normally pivot the dogs upon their pins into position to interlock with suitable notches 26 cut for the purpose in the wall of the ring 12. These dogs are so arranged and proportioned that when the top outer corners thereof are engaged with the notches 26, the lower cam-like ends thereof will be in close proximity for simultaneous engagement by the upper tapered end 27 of the plunger 28, by means of which the dogs are swung on their pivots so as to release the ring 12. The plunger 28 is slidably fitted in a suitable bore 29 extending upwardly and centrally of the main body from a recess 30 at the lower end thereof. The plunger extends into the space within the socket member 14 and is provided with a contact head 31 which is adapted to encounter the coupling or union 20 by which the plunger is moved against the urge of a positioning spring 32 which is coiled around the plunger and imprisoned between the bottom wall of the recess 30 and the head 31, the extent of movement of the plunger being limited by a pin 33 arranged in the main body and extending into a keyway 34 provided for the purpose in the plunger.

From the foregoing description, taken in connection with the accompanying drawing, it will be evident that in setting my improved fishing tool for use, the dogs are first engaged in the notches in the ring 12 and then the spring 10 is suitably compressed by means of the collar 8 threaded upon the main body. The tool is then entered in the well and manipulated until the coupling or union, upon being entrapped within the socket member 14, encounters the plunger by which the dogs are simultaneously actuated for the release of the ring and tubular body.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A coupling pulling device comprising a main body and a tubular body arranged for relative sliding movement; dog means rockably mounted within and protruding from the main body for releasably upholding the tubular body on the main body; and a socket member depending from the main body and having lift fingers arranged to be actuated by the tubular body upon the release therefrom of said dogs, substantially as described.

2. A coupling pulling device comprising a main body provided with a depending socket member having lift fingers; a spring pressed tubular body slidably arranged on the main body; a pair of dogs rockably mounted within and protruding from the main body for releasably upholding the tubular body thereon; and means for effecting the release of said dogs from said tubular body, substantially as described.

3. A coupling pulling device comprising a main body; a tubular body movable thereon; releasing means on the main body interlocking with the tubular body; a collar threaded on the main body; a spring coiled on the main body and imprisoned between said collar and tubular body; a socket member on the main body provided with lifting fingers arranged to be actuated by the tubular body; and means for operating the releasing means, substantially as described.

4. A coupling pulling device comprising a main body; a tubular body movable thereon; releasing means on the main body interlocking with the tubular body; a collar threaded on the main body; a spring coiled on the main body and imprisoned between said collar and tubular body; a socket member on the main body provided with lifting fingers arranged to be actuated by the tubular body; and means for operating the releasing means comprising a spring positioned plunger in the main body provided with a head located in the socket member, substantially as described.

5. In a coupling pulling device, a main body; a tubular body movably fitting the same; a pair of dogs pivoted in the main body and engaging notches in the tubular body for releasably securing the tubular body; a collar threaded on the main body; a spring on the main body imprisoned between said collar and tubular body; and a plunger in the main body arranged to trip said dogs from said notches to allow said spring to force the movement of said tubular body, substantially as described.

6. A coupling pulling device comprising a main body; a tubular body movably fitting the same; a pair of dogs pivoted in the main body and engaging notches in the tubular body for releasably securing the tubular body; a collar threaded on the main body; a spring on the main body imprisoned between said collar and tubular body; means for tripping said dogs from said notches to allow said spring to force movement of said tubular body; and a socket member on the main body having lift fingers arranged to be engaged and actuated by the released and spring forced tubular body, substantially as described.

7. A coupling pulling device comprising a main body; a ring slidable thereon; a tubular body surrounding the main body and fixed to said ring; dogs pivoted in the main body and engaging notches in the ring; a spring on the main body bearing on said ring; a socket member fixed to the main body and projecting from the tubular body; lift fingers on the projecting end of the socket member arranged to be actuated by said tubular body; and means positioned in the socket member and extending into the main body for tripping said dogs to allow said spring to force the movement of said tubular body, substantially as described.

In testimony whereof I have signed my name to this specification.

PETER GUSTAF LEONARD.